July 20, 1965 D. W. ROBERTSON 3,195,770
PLASTIC CAPSULE PACKAGING
Filed Feb. 18, 1963
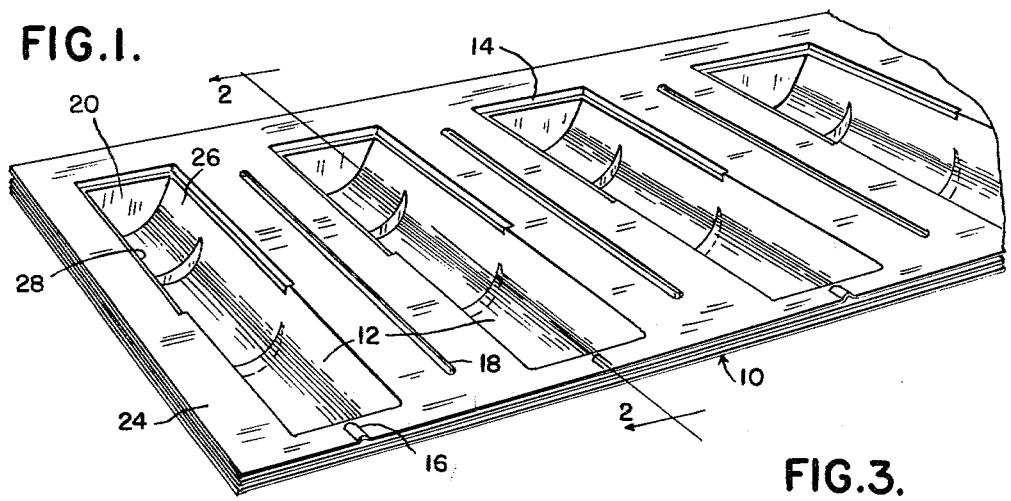
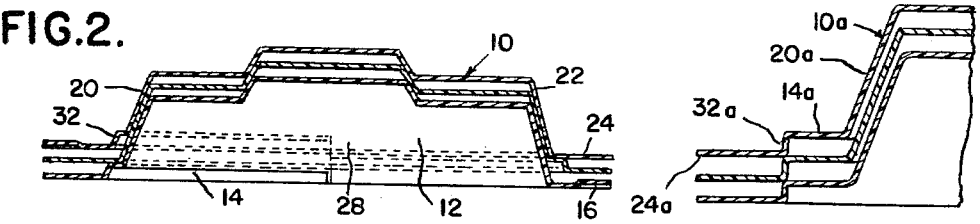
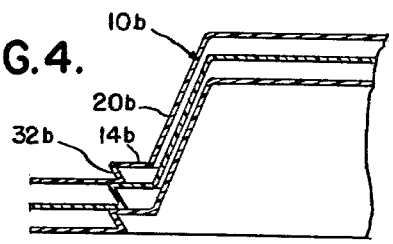
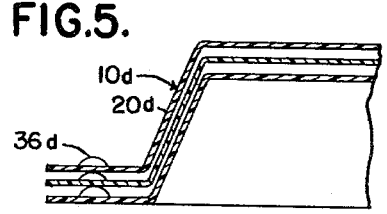
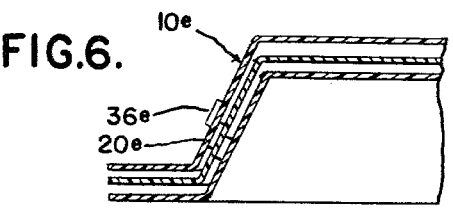
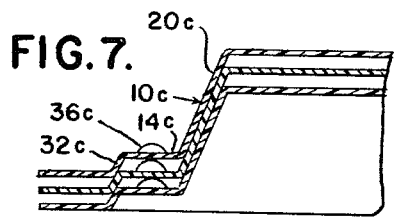
INVENTOR.
DUANE W. ROBERTSON
BY
ATTORNEYS

United States Patent Office 3,195,770
Patented July 20, 1965

3,195,770
PLASTIC CAPSULE PACKAGING
Duane W. Robertson, Troy, Mich., assignor to Holley
Plastics Company, Warren, Mich.
Filed Feb. 18, 1963, Ser. No. 259,071
2 Claims. (Cl. 220—23.6)

The invention relates to multi-capsule plastic packages and refers more specifically to members for use in manufacturing multi-capsule plastic packages including means integral therewith for spacing the members in nested relation for shipment or storage to aid in separation of the individual members.

Multi-capsule plastic packages, such as those disclosed in Holley Patent No. 2,984,346 are constructed of a bottom member comprising a substantially flat elongated rectangular plastic sheet having a plurality of spaced apart pockets therein for receiving articles to be packaged and a separate cover sheet. The bottom members are often produced in a location remote from articles to be packaged and the packaging location. Thus it is necessary to package the separately produced bottom members for shipment to the location where articles to be packaged are placed therein and the cover sheets sealed thereon.

It has been the practice in packaging the bottom members to alternately place large sheets of the bottom members with the pockets opening in opposite directions in cartons for shipment. Obviously with such packaging shipment becomes expensive due to the space taken up by each bottom member.

It is desirable to nest the capsules of each bottom member so that the total space required for each bottom member would be equal to or only slightly greater than the thickness of the plastic material from which the bottom members are constructed. However, when bottom members have been shipped in a nested condition in the past, separation of the nested bottom members has been a particular problem in that the plastic tends to weld together under the pressure of a plurality of bottom members so that the bottom members are damaged in separation.

It is therefore one of the objects of the present invention to provide an improved member for use in forming a multi-capsule plastic package including means for separating individual members from a plurality of members in a nested condition.

Another object is to provide a member for use in forming a multi-capsule plastic package comprising a plastic sheet having a plurality of pockets in spaced apart relation therein and including integral abutments for spacing the members from each other with the pockets nested.

Another object is to provide a member for use in forming a multi-capsule plastic package as set forth above wherein the pockets include opposite sides converging outwardly of the plastic sheet and said abutments are outwardly extending offsets provided in the opposite sides of the pockets.

Another object is to provide a member as set forth above wherein each pocket is substantially symmetrical and the sides adjacent one of said opposite sides are provided with a similar offset extending for approximately one-half the length thereof adjacent said one opposite side.

Another object is to provide a member as set forth above wherein the portion of the opposite sides between the offset and plastic sheet is perpendicular with respect thereto.

Another object is to provide a member as set forth above wherein the portion of the opposite sides between the offset and plastic sheet converge toward the plastic sheet.

Another object is to provide a member as set forth above wherein bosses are provided on the offset of said opposite sides extending outwardly of the pockets.

Another object is to provide a member as set forth above wherein bosses are provided adjacent said opposite sides of individual pockets on said plastic sheet.

Another object is to provide a member as set forth above wherein bosses are provided on said opposite sides of the pockets extending outwardly of the pockets.

Another object is to provide a member for use in forming a multi-capsule plastic package including means for spacing a plurality of members in nested relation which is simple in construction, economical to manufacture and efficient in use.

Other objects and features of the invention will become apparent as the description proceeds, especially when taken in conjunction with the accompanying drawings, illustrating preferred embodiments of the invention, wherein:

FIGURE 1 is a perspective view of a plurality of members for use in forming a multi-capsule plastic package constructed in accordance with the invention and in nested relation with each other.

FIGURE 2 is an inverted section view of the members illustrated in FIGURE 1 taken substantially on the line 2—2 in FIGURE 1.

FIGURES 3–7 are enlarged partial section views of modifications of the members illustrated in FIGURES 1 and 2.

With particular reference to the figures of the drawing, one embodiment of the invention will now be considered in detail.

As shown in FIGURES 1 and 2 the members 10 for use in manufacturing a multi-capsule plastic package include a plurality of pockets 12 spaced longitudinally thereof which may be nested to conserve space in packaging of the members 10 for shipment. Each of the pockets 12 is formed with an offset 14 in the walls thereof extending substantially half way around the individual capsules whereby the individual members 10 are spaced from each other during nesting for storage and shipment to prevent damaging of the members 10 in shipment and separation.

More specifically members 10 are for use in forming multi-capsule plastic packages such as disclosed in Holley Patent No. 2,984,346 and the commonly owned copending application, Serial No. 16,506, filed March 21, 1960, now Patent No. 3,124,241, granted March 10, 1964. The members 10 may be and usually are constructed of a clear plastic to allow inspection of articles packaged in the individual pockets 12 thereof and when a cover sheet is sealed around the individual pockets of a member 10, airtight, dust-proof and moisture-proof separate capsules are provided as indicated in the above referenced patent.

Members 10 may be provided with tear lines 16 and 18 if desired. Tear lines 16 permit ready access to individual capsules after articles have been sealed therein, while tear lines 18 provide ready means for detaching a single capsule from a complete multi-capsule plastic package after assembly of a cover sheet with a member 10. The tear lines 16 and 18 may be deep seal lines formed at the time of sealing a cover sheet to a member 10 if so desired.

In accordance with the invention, as shown in FIGURES 1 and 2, the individual pockets 12 which are substantially symmetrical are provided with opposite ends 20 and 22 which converge outwardly of the plastic sheet 24 from which the members 10 are formed. The capsules 12 further include the sides 26 and 28 which extend between the opposite ends 20 and 22 and which similarly converge outwardly of the plastic sheet 24. With the converging sides and ends nesting of a plurality of members 10 or sheets of members 10 from which individual members have not yet been cut may be stored in a nested position, as shown best in FIGURE 2.

To space nested individual members 10 from each other so that the individual members will not stick together causing difficulty in separation thereof and possible damage thereto, the offset 14 is provided extending across the end 20 of the upper member 10, as shown in FIGURE 1. The offset 14 extends along the sides 26 and 28 for approximately half the length of the sides 26 and 28, as shown in FIGURES 1 and 2. The offset 14 forms an abutment spaced from the plastic sheets 24.

In packing the individual members 10 for storage or shipment the pockets 12 of the members 10 are nested with the ends 20 and 22 of alternate members alternated, as shown best in FIGURE 2, whereby the portion of the sheets 24 immediately adjacent the end 22 of the individual pockets in which there is no offset 14 rests on the abutment formed by the offset 14 of the sides and end wall 20 of the member 10 immediately below.

With the structure illustrated in FIGURES 1 and 2 it is therefore possible to package a plurality of members 10 for use in forming a multi-capsule plastic package in a minimum of space. Further due to the advantages of the structure of FIGURES 1 and 2 wherein the capsules are spaced from each other a predetermined amount and each capsule rests on a substantial surface, there is little danger of sticking of the capsules to cause damage when individual capsules are removed from a package.

The modified members 10a, 10b and 10c, shown in FIGURES 3, 4 and 5, for use in forming a multi-capsule plastic package are each similar to the members 10 so that similar portions thereof have been given similar numbers followed by subscripts a, b and c, respectively.

In each of the modified members 10a, 10b and 10c offsets are provided at both ends of the pockets 12a, 12b and 12c but do not extend along the sides thereof. The pockets 12a are provided with a vertically extending portion 32a between the offset 14a and the plastic sheet 24a. The similar portions 32b and 32c of the members 10b and 10c converge inwardly toward the sheet 24b and outwardly of the sheet 24c, respectively, as shown in FIGURES 4 and 5. Additionally, abutments 36c are provided on the offset 14c of the members 10c.

The members 10b have the advantage of providing larger bearing surfaces between nested members than the structure of FIGURE 3, but is considerably more difficult to manufacture due to the reentrant nature of the portion 32b of the end walls. The members 10c have the advantage of permitting stacking of members 10c wherein the end walls are converging outwardly of the sheet 24c without the necessity of providing the offset portion in the side walls adjacent the ends 20c.

In the modified members 10d and 10e, shown respectively in FIGURES 5 and 6, the offset is entirely omitted from the opposite end walls and side walls of the individual capsules and abutments 36d and 36e are instead provided to space the individual members 10d and 10e when they are nested for storage or shipment.

While one embodiment of the present invention and modifications thereof have been considered in detail other embodiments and modifications of the invention are contemplated. It is the intention to include all such modifications and embodiments as are encompassed by the appended claims within the scope of the invention.

What I claim as my invention is:

1. A member for use in forming a multi-capsule plastic package comprising a substantially flat elongated rectangular plastic sheet having a plurality of symmetrical pockets therein for receiving articles to be packaged, said pockets being spaced apart longitudinally of the plastic sheet a dimension substantially equal to that of the corresponding dimension of the pockets and have opposite side and end walls converging away from the plane of the plastic sheet, one of said end walls having an offset therein adjacent the plane of the plastic sheet including a portion extending substantially horizontally parallel to the plastic sheet connected to the one end wall and a portion extending substantially parallel to the plane of the one end wall connected between the plastic sheet and horizontally extending portion, each of said side walls having a similar offset portion therein extending over substantially half the length thereof at the end thereof adjacent said one end wall including a portion extending substantially horizontally parallel to the plane of the plastic sheet connected to the respective side wall and a portion extending between the parallel portion and the plastic sheet substantially parallel to the respective side wall.

2. A plurality of members for use in forming a multi-capsule plastic package as set forth in claim 1 nested together with the one end wall of the pockets in adjacent members at opposite ends of the nested members.

References Cited by the Examiner

UNITED STATES PATENTS

| 2,774,473 | 12/56 | Williams | 206—65 |
| 2,961,123 | 11/60 | Boydak | 229—2.5 |
| 2,997,196 | 8/61 | Emery | 216—26.5 |

FOREIGN PATENTS

| 1,060,535 | 4/54 | France. |

THERON E. CONDON, *Primary Examiner.*

GEORGE O. RALSTON, *Examiner.*